(12) United States Patent
Kawamura

(10) Patent No.: US 9,551,864 B2
(45) Date of Patent: Jan. 24, 2017

(54) EYEPIECE LENS AND OBSERVATION APPARATUS HAVING THE SAME

(71) Applicant: CANON KABUSHIKI KAISHA, Tokyo (JP)

(72) Inventor: Jun Kawamura, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 60 days.

(21) Appl. No.: 14/477,303

(22) Filed: Sep. 4, 2014

(65) Prior Publication Data

US 2015/0070777 A1    Mar. 12, 2015

(30) Foreign Application Priority Data

Sep. 9, 2013  (JP) .................................. 2013-186065
Jul. 7, 2014  (JP) .................................. 2014-140029

(51) Int. Cl.
*G02B 25/00*  (2006.01)
*G02B 13/18*  (2006.01)
(Continued)

(52) U.S. Cl.
CPC .............. *G02B 25/001* (2013.01); *G02B 9/16* (2013.01); *G02B 13/18* (2013.01); *G03B 13/06* (2013.01); *G02B 23/14* (2013.01)

(58) Field of Classification Search
CPC ......... G02B 25/001; G02B 9/16; G02B 13/18; G02B 23/14; G03B 13/12
(Continued)

(56) References Cited

U.S. PATENT DOCUMENTS 2,699,700 A * 1/1955 Klemt ................... G02B 7/04
                                                    359/690
3,141,921 A * 7/1964 Linke .................... G02B 23/14
                                                    359/690
(Continued)

FOREIGN PATENT DOCUMENTS

CN    201740920 U    2/2011
JP    2002-341259 A    11/2002
(Continued)

OTHER PUBLICATIONS

European Search Report issued in corresponding application No. 14183511.6 on Feb. 13, 2015.
(Continued)

*Primary Examiner* — Jordan Schwartz
*Assistant Examiner* — George G King
(74) *Attorney, Agent, or Firm* — Carter, DeLuca, Farrell & Schmidt, LLP

(57) ABSTRACT

There is provided an eyepiece lens which has a long length from an image display surface to a first lens, a high observation magnification, and a large apparent field of view. An eyepiece lens used to observe an image displayed on the image display surface includes a first lens with a positive refractive power, a second lens with a negative refractive power, and a third lens with a positive refractive power sequentially from the image display surface side to the observation side. The lens surface of the first lens on the image display surface side has a convex shape on the image display surface side. The lens surface of the second lens on the observation side has a concave shape on the observation side. The focal length of the eyepiece lens, the focal length of the lens surface, and the focal length of the lens surface are set appropriately.

7 Claims, 6 Drawing Sheets

(51) Int. Cl.
  *G02B 9/16*   (2006.01)
  *G03B 13/06*  (2006.01)
  *G02B 23/14*  (2006.01)
(58) Field of Classification Search
  USPC .................................................. 359/645, 690
  See application file for complete search history.

(56) References Cited

U.S. PATENT DOCUMENTS

2004/0165283 A1\* 8/2004 Cahall .................. G02B 13/003
                                                       359/802
2011/0242397 A1   10/2011 Miyazawa et al.

FOREIGN PATENT DOCUMENTS

| | | |
|---|---|---|
| JP | 2006-65265 A  | 3/2006 |
| JP | 2007-058041 A | 3/2007 |
| JP | 2011-221091 A | 11/2011 |

OTHER PUBLICATIONS

Russian office action issued in corresponding application No. 2014135730 on Mar. 17, 2016.
Chinese Office Action issued in corresponding application No. 201410444653.9 on Mar. 31, 2016.

\* cited by examiner

REFERENCE STATE
−2.0[diopter]

+8.0[diopter]

−10.0[diopter]

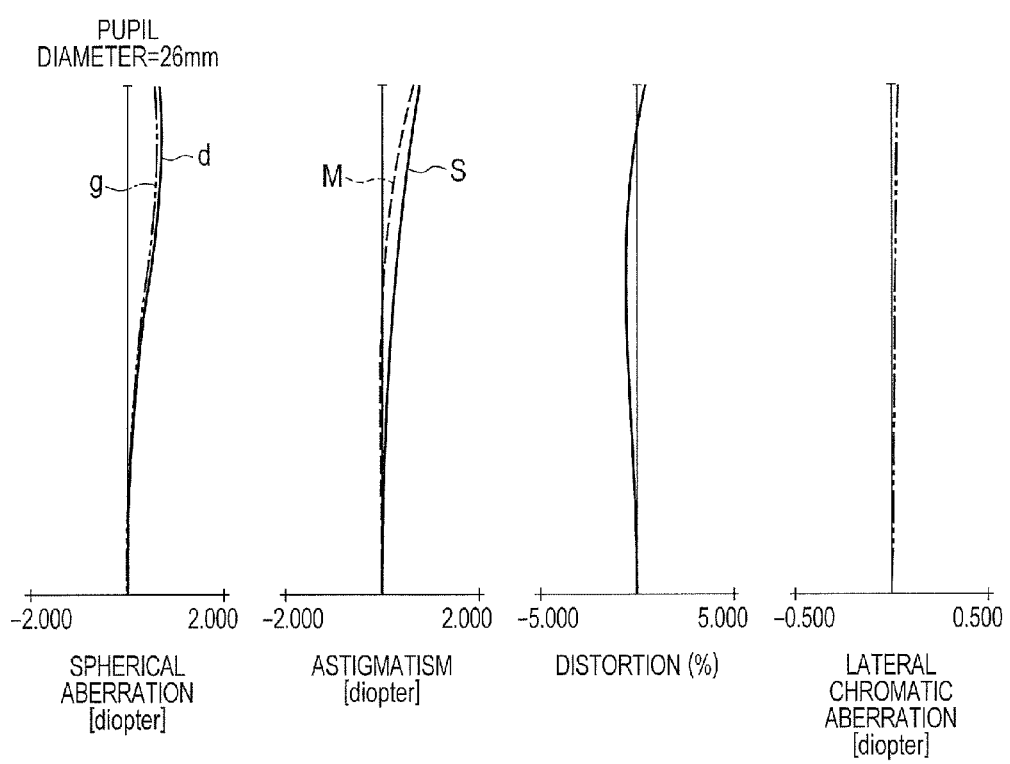

REFERENCE STATE
-2.0[diopter]

+6.0[diopter]

-8.0[diopter]

REFERENCE STATE
−2.0[diopter]

+3.0[diopter]

−6.0[diopter]

EYEPIECE LENS AND OBSERVATION APPARATUS HAVING THE SAME

BACKGROUND OF THE INVENTION

Field of the Invention

The present invention relates to an eyepiece lens and an observation apparatus having the same, and is suitable for observing an image displayed on an image display element in an electronic viewfinder used in, e.g., a video camera, still camera, or broadcasting camera.

Description of the Related Art

An electronic viewfinder used in an image pickup apparatus (camera) such as a video camera or still camera has conventionally used an eyepiece lens to enlarge and observe an image displayed on a liquid crystal image display. To easily view the image display surface in the electronic viewfinder, it is necessary to enlarge the image display surface such as a liquid crystal image display, or increase the observation magnification of the eyepiece lens.

However, a large image display surface upsizes the viewfinder. To downsize the overall viewfinder, the observation magnification of the eyepiece lens is preferably increased. To increase the observation magnification of the eyepiece lens, the positive refractive power of the eyepiece lens needs to be high. At this time, if the eyepiece lens is constituted by only lenses (positive lenses) with a positive refractive power, axial chromatic aberration and lateral chromatic aberration are greatly generated, and it becomes difficult to correct these aberrations.

To improve the performance at the time of observation, aberrations including chromatic aberration need to be corrected using a lens (negative lens) with a negative refractive power. An eyepiece lens constituted by three lenses including negative and positive lenses has conventionally been known.

Japanese Patent Application Laid-Open No. 2006-65265 has disclosed an eyepiece lens which is constituted by a positive lens, positive lens, and negative lens sequentially from the image display surface side to the observation side (eye point side), and has a long interval from the image display surface to the first lens. Japanese Patent Application Laid-Open No. 2011-221091 has disclosed an eyepiece lens which is constituted by a positive lens, negative lens, and positive lens sequentially from the image display surface side to the observation side, has a high enlargement ratio, and is compact in the entire system.

SUMMARY OF THE INVENTION

Generally, when the refractive power of an eyepiece lens is increased, the interval from the image display surface to the first lens of the eyepiece lens is shortened. When, for example, a reflection liquid crystal display element is used as the image display element, a predetermined interval or more is required between the image display surface and the first lens. Thus, if the interval from the image display surface to the first lens is short, it becomes difficult to use the reflection liquid crystal display element.

For this reason, the eyepiece lens used in the electronic viewfinder is requested to have a high refractive power and a long distance from the image display surface to the first lens surface of the eyepiece lens. To obtain an eyepiece lens with a high refractive power and a long distance from the image display surface to the first lens surface, it is important to appropriately set the number of lenses constituting the eyepiece lens, the lens shape, the refractive power of the lens surface, and the like. If these settings are improper, it becomes difficult to satisfactorily observe image information displayed on the image display surface at a high observation magnification.

According to the present invention, there is provided an eyepiece lens including in order from an object side to an observation side: a first lens having a positive refractive power; a second lens having a negative refractive power; and a third lens having a positive refractive power, wherein a lens surface (R1$a$) of the first lens on the object side has a convex shape, a lens surface (R2$b$) of the second lens on the observation side has a concave shape, and the following conditional expressions are satisfied:

$$0.65 < f11/f < 1.00$$

$$-0.75 < f22/f < -0.30$$

where f represents a focal length of the eyepiece lens, f11 represents a focal length of the lens surface (R1$a$) of the first lens on the object side, and f22 represents a focal length of the lens surface (R2$b$) of the second lens on the observation side.

Further features of the present invention will become apparent from the following description of exemplary embodiments with reference to the attached drawings.

BRIEF DESCRIPTION OF THE DRAWINGS

FIG. 2 is a chart of the aberrations of the eyepiece lens according to the first embodiment of the present invention.

DESCRIPTION OF THE EMBODIMENTS

Preferred embodiments of the present invention will now be described in detail in accordance with the accompanying drawings.

An eyepiece lens according to the present invention is an eyepiece lens used to observe an image displayed on an image display surface. The eyepiece lens comprises the first lens with a positive refractive power, the second lens with a negative refractive power, and the third lens with a positive refractive power sequentially from the image display surface side to the observation side.

Figure 1A:
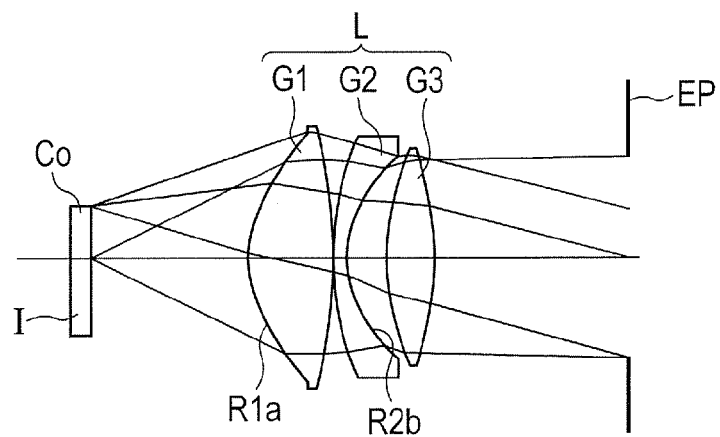
FIG. 1A is a lens sectional view of an eyepiece lens (reference state: −2.0 diopter) according to the first embodiment of the present invention.
Figure 1B:
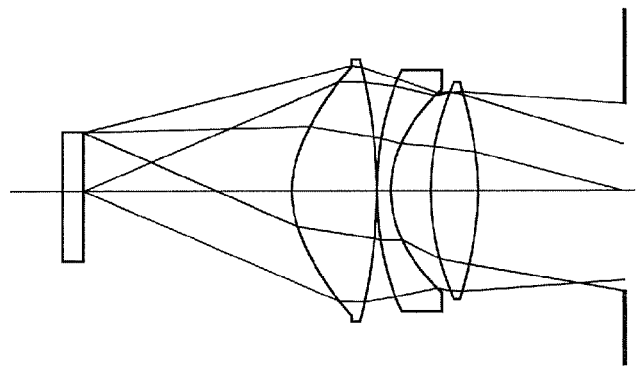
FIG. 1B is a lens sectional view of an eyepiece lens (8.0 diopter) according to the first embodiment of the present invention.
Figure 1C:
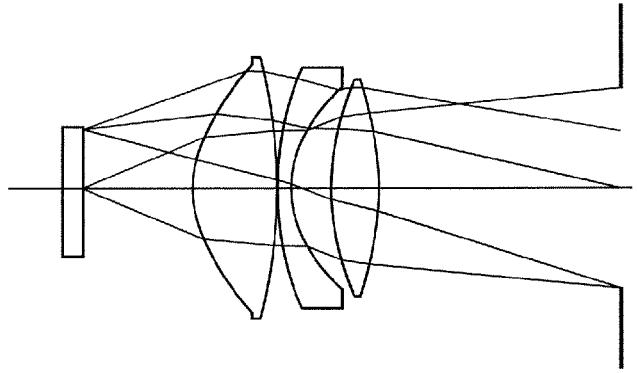
FIG. 1C is a lens sectional view of an eyepiece lens (−10.0 diopter) according to the first embodiment of the present invention.
Figure 3A:
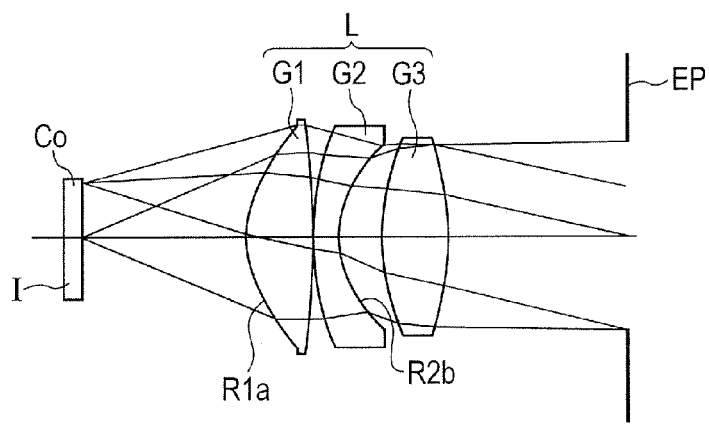
FIG. 3A is a lens sectional view of an eyepiece lens (reference state: −2.0 diopter) according to the second embodiment of the present invention.
Figure 3B:
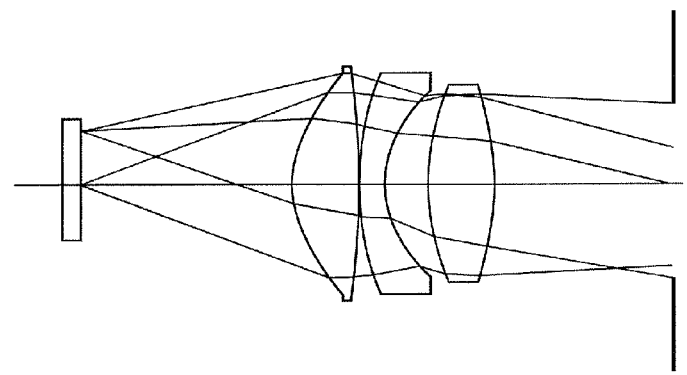
FIG. 3B is a lens sectional view of an eyepiece lens (+6.0 diopter) according to the second embodiment of the present invention.
Figure 3C:
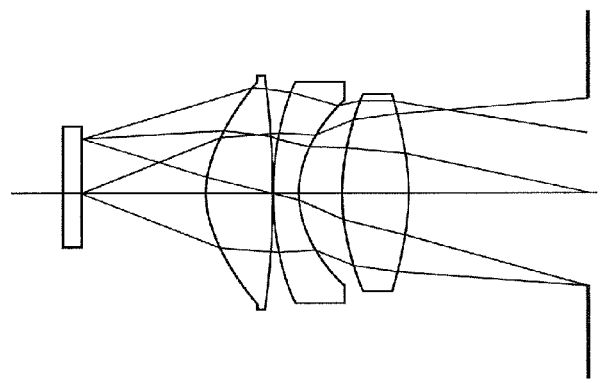
FIG. 3C is a lens sectional view of an eyepiece lens (−8.0 diopter) according to the second embodiment of the present invention.
Figure 4:
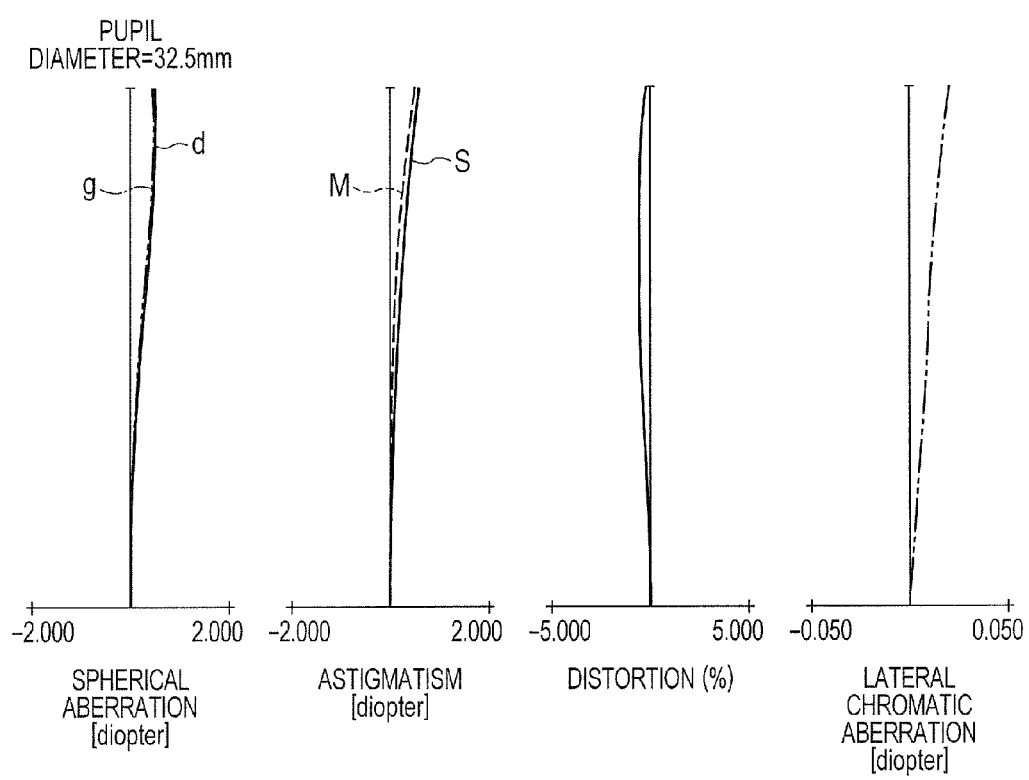
FIG. 4 is a chart of the aberrations of the eyepiece lens according to the second embodiment of the present invention.

FIGS. 1A, 1B, and 1C are lens sectional views when the diopter of an eyepiece lens according to the first embodiment of the present invention is −2.0 (reference state), 8.0, and −10.0, respectively. FIG. 2 is an aberration chart in the reference state of the eyepiece lens according to the first embodiment of the present invention. FIGS. 3A, 3B, and 3C are lens sectional views when the diopter of an eyepiece lens according to the second embodiment of the present invention is −2.0 (reference state), 6.0, and −8.0, respectively. FIG. 4 is an aberration chart in the reference state of the eyepiece lens according to the second embodiment of the present invention.

Figure 5A:
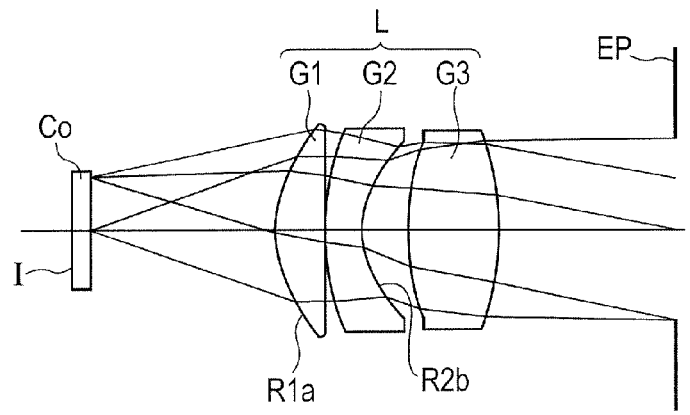
FIG. 5A is a lens sectional view of an eyepiece lens (reference state: −2.0 diopter) according to the third embodiment of the present invention.
Figure 5B:
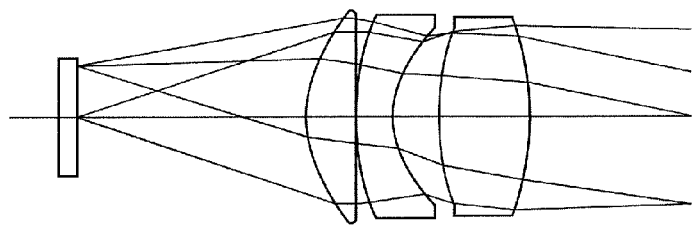
FIG. 5B is a lens sectional view of an eyepiece lens (+3.0 diopter) according to the third embodiment of the present invention.
Figure 5C:
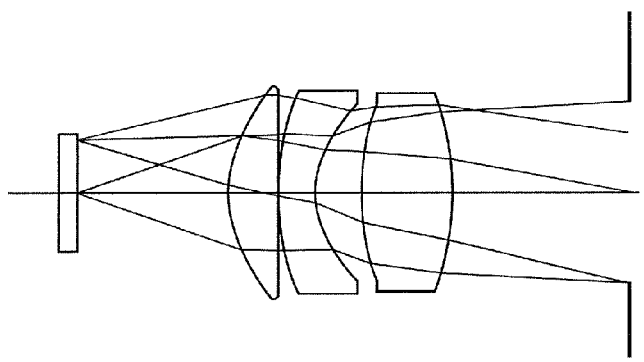
FIG. 5C is a lens sectional view of an eyepiece lens (−6.0 diopter) according to the third embodiment of the present invention.
Figure 6:
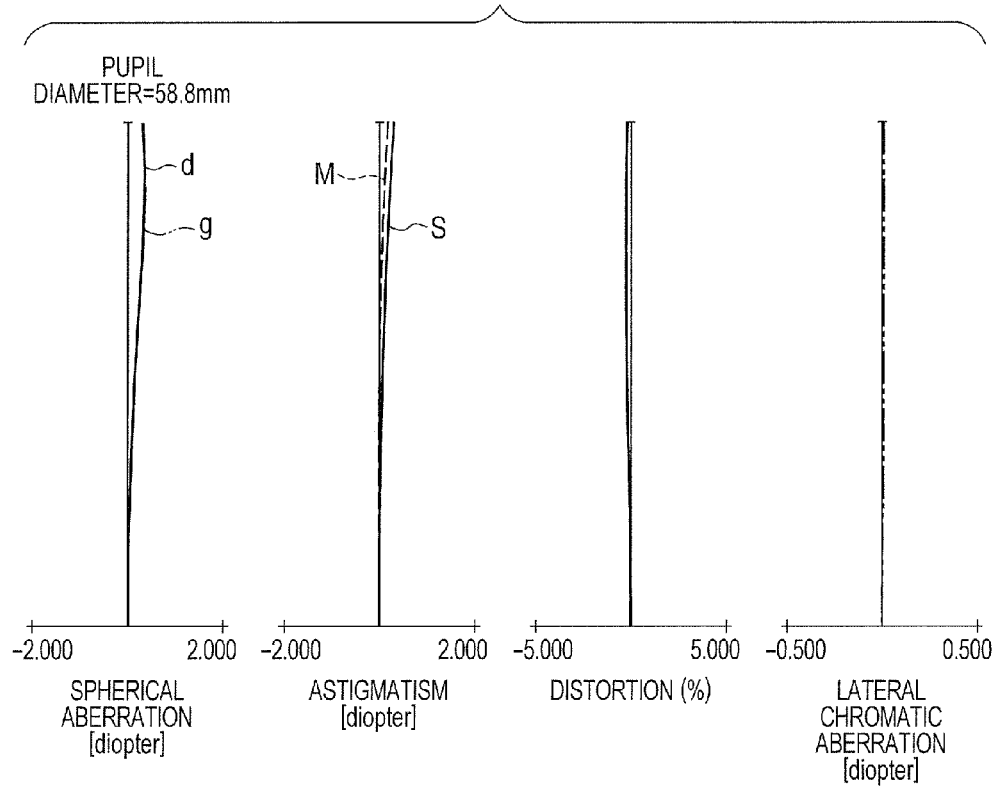
FIG. 6 is a chart of the aberrations of the eyepiece lens according to the third embodiment of the present invention.
Figure 7:
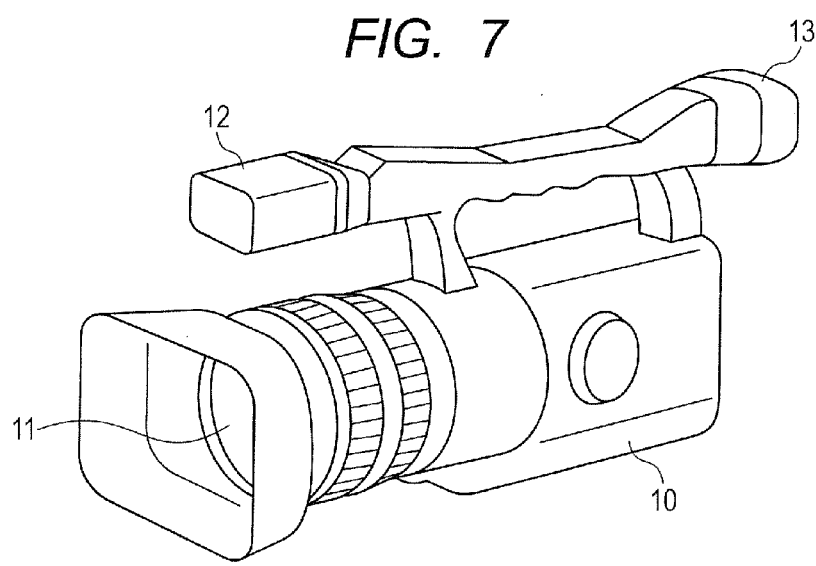
FIG. 7 is a schematic view of the main part of an image pickup apparatus according to the present invention.

FIGS. 5A, 5B, and 5C are lens sectional views when the diopter of an eyepiece lens according to the third embodiment of the present invention is −2.0 (reference state), 3.0, and −6.0, respectively. FIG. 6 is an aberration chart in the reference state of the eyepiece lens according to the third embodiment of the present invention. FIG. 7 is a schematic view of the main part of an image pickup apparatus according to the present invention.

The eyepiece lens according to each embodiment is an eyepiece lens used in the electronic viewfinder of an image pickup apparatus such as a digital camera or video camera. In each lens sectional view, the left side is the image display surface side (object side), and the right side is the observation side (exit pupil side). In each lens sectional view, L is an eyepiece lens. Co is an image display element formed from a liquid crystal, organic EL, or the like. I is the image display element surface of the image display element Co. The eyepiece lens L is constituted by a first lens G1 with a positive refractive power, a second lens G2 with a negative refractive power, and a third lens G3 with a positive refractive power. EP is an eye point (exit pupil) for observation.

Note that a plate or the like to protect the image display surface or lens may be interposed between the image display surface I and a lens surface R1a of the first lens G1, or between the eyepiece lens L and the eye point EP. The eye point EP may be moved back and forth in the optical axis direction as long as a beam traveling from the image display surface I through the most periphery passes through the pupil of an observer.

In each aberration chart, the finder diopter is in the reference state. In the spherical aberration chart, a solid line d indicates a d-line (wavelength of 587.6 nm), and a chain double-dashed line g indicates a g-line (wavelength of 435.8 nm). In the astigmatism chart, a solid line S indicates the sagittal image plane of the d-line, and a dotted line M indicates the meridional image plane of the d-line. The lateral chromatic aberration is represented for the g-line.

The eyepiece lens L according to each embodiment is constituted by the first lens G1 with a positive refractive power, the second lens G2 with a negative refractive power, and the third lens G3 with a positive refractive power sequentially from the image display surface I side (object side) to the observation side (eye point side) EP.

In the eyepiece lens L according to each embodiment, the lens surface R1a of the first lens G1 on the image display surface I side has a positive refractive power, and the principal point position of the entire system of the eyepiece lens L on the image display surface I side is shifted to the image display surface I side to increase the interval from the image display surface I to the first lens G1. A subsequent beam height (distance from the optical axis) on the lens surface on the observation side (eye point side) EP is decreased to suppress the generation amount of coma after the lens surface of the first lens G1 on the observation side.

Further, a lens surface R2b of the second lens G2 on the observation side is designed to have a concave shape so that the curvature radius of the lens surface R2b becomes close to that of the lens surface R1a, thereby satisfactorily correcting coma. In addition, the lens surfaces R1a and R2b are designed to have aspherical shapes, thereby reducing high-order aberrations generated at the lens periphery.

In the eyepiece lens L according to each embodiment, the diopter is adjusted by moving all the lenses, i.e., the first lens G1 to the third lens G3 integrally (without changing their relative positional relationship) in the optical axis direction, thereby reducing variations of coma upon a change of the diopter. In diopter adjustment, not all the three lenses need be moved integrally. One or two lenses of the first lens G1 to the third lens G3 may be moved, or the lenses may be moved at moving amounts different from each other.

In the eyepiece lens according to each embodiment, the lens surface R1a of the first lens G1 on the image display surface I side has a convex shape on the image display surface I side, and the lens surface R2b of the second lens G2 on the observation side has a concave shape on the observation side. The following conditional expressions are satisfied:

$$0.65 < f11/f < 1.00 \tag{1}$$

$$-0.75 < f22/f < -0.30 \tag{2}$$

where f represents the focal length of the eyepiece lens L, f11 represents the focal length of the lens surface R1a, and f22 represents the focal length of the lens surface R2b.

The focal length fr of the lens surface is given by:

$$fr = R/(N'-N)$$

where R represents the curvature radius of the lens surface, and N and N' represent the refractive indices of media on the incident side and exit side of the lens surface.

Next, the technical meanings of the above-described conditional expressions will be explained.

Conditional expression (1) defines the ratio of the focal length of the lens surface R1a to the focal length of the entire system of the eyepiece lens. If the ratio exceeds the upper limit value in conditional expression (1), the space where the reflection image display element Co is arranged becomes narrow, it becomes difficult to arrange the image display element Co, and usable image display elements Co are limited. To the contrary, if the ratio becomes lower than the lower limit value, coma, astigmatism, and high-order aberrations increase.

Conditional expression (2) defines the ratio of the focal length of the lens surface R2b to the focal length of the entire system of the eyepiece lens. If the ratio exceeds the upper limit value in conditional expression (2), coma, astigmatism, and high-order aberrations increase. In contrast, if the ratio becomes lower than the lower limit value, the space where the reflection image display element Co is arranged becomes narrow, it becomes difficult to arrange the image display element, and usable image display elements Co are limited. More preferably, the numerical ranges of conditional expressions (1) and (2) are set as follows:

$$0.75 < f11/f < 0.98 \tag{1a}$$

$$-0.745 < f22/f < -0.400 \tag{2a}$$

This arrangement provides an eyepiece lens which has a high enlargement ratio and a large apparent field of view, and makes it possible to satisfactorily observe an image displayed on the image display surface I while increasing the interval from the image display surface I to the first lens G1. More preferably, one or more of the following conditional expressions are satisfied in each embodiment.

Assume that the lens surface R1a has an effective diameter DR11 and an aspherical shape, and Lp is the length in the optical axis direction from the surface vertex of the lens surface R1a to the position of the effective diameter of the lens surface R1a. Also, assume that the lens surface R2b has an effective diameter DR22 and an aspherical shape, and Ln is the length in the optical axis direction from the surface vertex of the lens surface R2b to the position of the effective diameter of the lens surface R2b.

At this time, it is preferable to satisfy one or both of conditional expressions:

$$0.18 < Lp/DR11 < 0.25 \quad (3)$$

$$0.80 < (Lp/DR11)/(Ln/DR22) < 1.10 \quad (4)$$

Next, the technical meanings of the above-mentioned conditional expressions will be explained.

Conditional expression (3) defines the curvature depth of the lens surface R1a with respect to the effective diameter of the lens surface R1a. If the depth exceeds the upper limit value in conditional expression (3), coma, astigmatism, and high-order aberrations increase. To the contrary, if the depth becomes lower than the lower limit value, the space where the reflection image display element Co is arranged becomes narrow, it becomes difficult to arrange the image display element Co, and usable image display elements Co are limited.

Conditional expression (4) defines the ratio of the curvature depth of the lens surface R1a to the effective diameter of the lens surface R1a, and the ratio of the curvature depth of the lens surface R2b to the effective diameter of the lens surface R2b. If the depth exceeds the upper limit value in conditional expression (4) or becomes lower than the lower limit value, coma, astigmatism, and high-order aberrations increase. As long as the depth falls within the range of conditional expression (4), comas generated on the respective lens surfaces R1a and R2b cancel each other, and satisfactory optical performance can be maintained. More preferably, the numerical ranges of conditional expressions (3) and (4) are set as follows:

$$0.190 < Lp/DR11 < 0.245 \quad (3a)$$

$$0.85 < (Lp/DR11)/(Ln/DR22) < 1.00 \quad (4a)$$

As described above, each embodiment can provide an eyepiece lens which makes it possible to observe a large image at high image quality while downsizing the image display surface I and eyepiece lens L.

Also, it is desirable to satisfy one or both of the following conditional expressions:

$$-100.00 < (r2b+r1a)/(r2b-r1a) < -5.00 \quad (5)$$

$$0.30 < (r1b+r1a)/(r1b-r1a) < 1.50 \quad (6)$$

where r1a is the curvature radius (paraxial curvature radius) of the lens surface R1a of the first lens G1 on the image display surface I side, r1b is the curvature radius (paraxial curvature radius) of the lens surface of the first lens G1 on the observation side, and r2b is the curvature radius (paraxial curvature radius) of the lens surface R2b of the second lens G2 on the observation side.

Conditional expression (5) defines the shape factor of the lens surface R1a of the first lens G1 on the image display surface I side and the lens surface R2b of the second lens G2 on the observation side. By satisfying conditional expression (5), coma, astigmatism, and high-order aberrations generated on the lens surface R1a of the first lens G1 on the image display surface I side and the lens surface R2b of the second lens G2 on the observation side can be effectively canceled.

If the shape factor exceeds the upper limit value in conditional expression (5), the difference between the curvature radii of the lens surfaces R1a and R2b becomes excessively large, and it undesirably becomes difficult to sufficiently correct coma, astigmatism, and high-order aberrations.

If the shape factor becomes lower than the lower limit value in conditional expression (5), the curvature radii of the lens surfaces R1a and R2b become excessively large, and the effect of canceling coma, astigmatism, and high-order aberrations is weakened undesirably.

Conditional expression (6) defines the shape factor of the lens surface R1a of the first lens G1 on the image display surface I side and the lens surface of the first lens G1 on the observation side. If the shape factor exceeds the upper limit value in conditional expression (6), the principal point position on the image display surface I side moves to the observation side, the space where the reflection image display element Co is arranged becomes narrow, and it becomes difficult to arrange the image display element. As a result, usable image display elements Co are undesirably limited.

If the shape factor becomes lower than the lower limit value in conditional expression (6), coma, astigmatism, and high-order aberrations are greatly generated undesirably.

Preferably, the numerical ranges of conditional expressions (5) and (6) are set as follows:

$$-57.70 < (r2b+r1a)/(r2b-r1a) < -9.27 \quad (5a)$$

$$0.59 < (r1b+r1a)/(r1b-r1a) < 1.07 \quad (6a)$$

Also, when the eyepiece lens L according to each embodiment is used in the image display element Co for displaying an image, and an observation apparatus for observing image information displayed on the image display surface I of the image display element Co, it is preferable to satisfy one or both of the following conditional expressions. Let H be the diagonal length of the image display surface I, and L be the air equivalent length from the image display surface I to the lens surface R1a of the first lens G1 when the diopter is 0. Then, it is preferable to satisfy one or both of the following conditional expressions:

$$0.15 < H/f < 0.30 \quad (7)$$

$$0.70 < L/f < 0.80 \quad (8)$$

Next, the technical meanings of the above-described conditional expressions will be explained.

Conditional expression (7) defines the ratio of the diagonal length of the image display element Co to the focal length of the entire system of the eyepiece lens L. If the ratio exceeds the upper limit value in conditional expression (7), the space where the reflection image display element Co is arranged becomes narrow, it becomes difficult to arrange the image display element Co, and usable image display elements Co are limited. To the contrary, if the ratio becomes lower than the lower limit value, the overall optical length (length from the first lens surface to the final lens surface) of the eyepiece lens L becomes long.

Conditional expression (8) defines the ratio, to the focal length of the entire system of the eyepiece lens L, of the interval between the image display surface I and the lens surface R1a of the first lens G1. If the ratio exceeds the upper limit value in conditional expression (8), coma and astigmatism increase. If the ratio becomes lower than the lower limit value, the space where the reflection image display element Co is arranged becomes narrow, it becomes difficult to arrange the image display element Co, and usable image display elements Co are limited. More preferably, the numerical ranges of conditional expressions (7) and (8) are set as follows.

$$0.16 < H/f < 0.28 \quad (7a)$$

$$0.72 < L/f < 0.78 \quad (8a)$$

Next, an image pickup apparatus including the observation apparatus according to the present invention will be described.

The image pickup apparatus according to the present invention includes an image pickup element which picks up an object image, an image display element which displays the image of the object picked up by the image pickup element, and an observation apparatus used to observe image information displayed on the image display surface of the image display element.

The image pickup apparatus according to the present invention will be described by exemplifying a video camera with reference to FIG. 7. In FIG. 7, the video camera includes a video camera body (image pickup apparatus main body) 10, a photographing optical system (image pickup optical system) 11 which forms an object image on an image pickup element (not shown), and a directional microphone 12. An observation apparatus (electronic viewfinder) 13 is used to observe an object image displayed on an image display element (not shown) through the eyepiece lens according to the present invention. The image display element is constituted by a liquid crystal panel or the like, and displays an object image or the like formed by the photographing optical system 11. An object image can be preferably observed by applying the observation apparatus according to the present invention to the image pickup apparatus such as a video camera in this manner.

A numerical embodiment corresponding to each embodiment of the present invention will be described. In the numerical embodiment, ri represents the paraxial curvature radius of the i-th surface sequentially from the image display surface to the observation side, and di represents the on-axis surface interval between the ith surface and the (i+1)-th surface. Further, ni represents the refractive index of the ith glass material with respect to the d-line (wavelength=578.6 nm), and vi represents the Abbe number of the ith glass material with respect to the d-line. r1 represents the image display surface, and r8 represents the eye point EP.

Note that the length unit is [mm], unless otherwise specified. However, the eyepiece lens optical system L obtains the same optical performance regardless of proportional enlargement or proportional reduction, so the unit is not limited to [mm], and another proper unit is usable. In each numerical embodiment, a surface written as an aspherical surface in the paraxial curvature radius field is an aspherical shape defined by the following equation:

$$x = (h^2/R)/[1 + [1 - (1+k)(h/R)^2]^{1/2}] + A4h^4 + A6h^6$$

where x is the distance in the optical axis direction from the surface vertex of the lens surface, h is the height in a direction perpendicular to the optical axis, R is the paraxial curvature radius at the surface vertex of the lens surface, k is the conic constant, and A4 and A6 are polynomial coefficients (aspherical coefficients), respectively. In a table representing aspherical coefficients, "e-i" is an exponential representation having a base of 10, i.e., "10$^{-i}$". Table 1 shows the relationship between the above-described conditional expressions, and numerical values in the numerical embodiment.

[Numerical Embodiment 1]
Unit mm

Surface Data

| Surface Number | r | d | nd | vd |
|---|---|---|---|---|
| 1 | (Image display surface) | (Variable) | | |
| 2* | 10.477 | 8.39 | 1.49171 | 57.4 |
| 3 | −49.574 | −0.00 | | |
| 4 | 30.808 | 1.30 | 1.63400 | 23.9 |
| 5* | 10.085 | 4.10 | | |
| 6* | 26.604 | 4.73 | 1.49171 | 57.4 |
| 7* | −27.532 | (Variable) | | |
| 8 | (Eye point) | | | |

Aspherical Data

2nd Surface

K = −1.85804e+000
5th Surface

K = −8.27900e−001
6th Surface

K = 7.03727e−001
7th Surface

K = −5.84921e+000  A4 = −1.21085e−005  A6 = 1.00489e−007

Various Data

| Diopter | −2.0 | +8.0 | −10.0 |
|---|---|---|---|
| Focal Length | 22.10 | 22.10 | 22.10 |
| d1 | 15.70 | 20.46 | 11.01 |
| d7 | 19.40 | 14.64 | 24.09 |

[Numerical Embodiment 2]
Unit mm

Surface Data

| Surface Number | r | d | nd | vd |
|---|---|---|---|---|
| 1 | (Image display surface) | (Variable) | | |
| 2* | 11.055 | 7.09 | 1.49171 | 57.4 |
| 3 | −91.313 | −0.00 | | |
| 4 | 30.065 | 2.60 | 1.63400 | 23.9 |
| 5* | 9.983 | 4.80 | | |
| 6* | 26.321 | 6.95 | 1.49171 | 57.4 |
| 7* | −28.790 | 19.00 | | |
| 8 | (Eye point) | | | |

Aspherical Data

2nd Surface

K = −1.75305e+000
5th Surface

K = −9.09128e−001
6th Surface

K = −7.46404e−001

[Numerical Embodiment 2]
Unit mm

7th Surface

K = 8.51859e−001  A4 = 1.64082e−005  A6 = 3.05569e−008

Various Data

| Diopter | −2.0 | +6.0 | −8.0 |
|---|---|---|---|
| Focal Length | 25.00 | 25.00 | 25.00 |
| d1 | 17.36 | 22.20 | 13.27 |

[Numerical Embodiment 3]
Unit mm

Surface Data

| Surface Number | r | d | nd | vd |
|---|---|---|---|---|
| 1 | (Image display surface) | (Variable) | | |
| 2* | 12.593 | 5.47 | 1.49171 | 57.4 |
| 3 | −1030.662 | −0.00 | | |
| 4 | 29.335 | 4.04 | 1.63400 | 23.9 |
| 5* | 10.365 | 5.00 | | |
| 6* | 27.418 | 10.00 | 1.49171 | 57.4 |
| 7* | −30.747 | 19.40 | | |
| 8 | (Eye point) | | | |

Aspherical Data

2nd Surface

K = −1.60310e+000

5th Surface

K = −8.65443e−001

6th Surface

K = −1.43041e+000

7th Surface

K = −1.87051e+000  A4 = −5.88084e−006  A6 = −1.53534e−008

Various Data

| Diopter | −2.0 | +3.0 | −6.0 |
|---|---|---|---|
| Focal Length | 30.00 | 30.00 | 30.00 |
| d1 | 20.66 | 25.14 | 16.90 |

TABLE 1

| | First Embodiment | Second Embodiment | Third Embodiment |
|---|---|---|---|
| Conditional Expression (1) | 0.97 | 0.90 | 0.85 |
| Conditional Expression (2) | −0.74 | −0.63 | −0.54 |
| Conditional Expression (3) | 0.24 | 0.23 | 0.20 |
| Conditional Expression (4) | 0.93 | 0.92 | 0.89 |
| Conditional Expression (5) | −52.45 | −19.63 | −10.30 |
| Conditional Expression (6) | 0.65 | 0.78 | 0.98 |
| Conditional Expression (7) | 0.26 | 0.23 | 0.19 |
| Conditional Expression (8) | 0.76 | 0.75 | 0.75 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-186065, filed Sep. 9, 2013, and Japanese Patent Application No. 2014-140029, filed Jul. 7, 2014 which are hereby incorporated by reference herein in their entirety.

What is claimed is:

1. An eyepiece lens comprising in order from an object side to an observation side:
   a first lens having a positive refractive power;
   a second lens having a negative refractive power; and
   a third lens having a positive refractive power,
   wherein a lens surface of the first lens on the object side has a convex shape,
   wherein a lens surface of the second lens on the observation side has a concave shape, and
   wherein the following conditional expressions are satisfied:

$0.65 < f11/f < 1.00;$ $-0.75 < f22/f < -0.30;$ and $-100.00 < (r2b + r1a)/(r2b - r1a) < -5.00$ where f represents a focal length of the eyepiece lens, f11 represents a focal length of the lens surface of the first lens on the object side, f22 represents a focal length of the lens surface of the second lens on the observation side, r1a represents a curvature radius of the lens surface of the first lens on the object side, and r2b represents a curvature radius of the lens surface of the second lens on the observation side.

2. The eyepiece lens according to claim 1, wherein the lens surface of the first lens on the object side has an aspherical shape, and the following conditional expression is satisfied, $0.18 < Lp/DR11 < 0.25$ where DR11 represents an effective diameter of the lens surface of the first lens on the object side, and Lp represents a length in an optical axis direction from the object side lens surface vertex of the first lens to a position of the effective diameter of the lens surface of the first lens on the object side.

3. The eyepiece lens according to claim 1, wherein the lens surface of the first lens on the object side has an aspherical shape, the lens surface of the second lens on the observation side has an aspherical shape, and the following conditional expression is satisfied, $0.80 < (Lp/DR11)/(Ln/DR22) < 1.10$ where DR11 represents an effective diameter of the lens surface of the first lens on the object side, Lp represents the length in the optical axis direction from the object side lens surface vertex of the first lens to the position of the effective diameter of the lens surface of the first lens on the object side, DR22 represents an effective diameter of the lens surface of the second lens on the observation side, and Ln represents the length in the optical axis direction from the observation side lens surface vertex of the second lens to the position of the effective diameter of the lens surface of the second lens on the observation side.

4. The eyepiece lens according to claim 1, wherein the following conditional expression is satisfied, $0.30 < (r1b + r1a)/(r1b - r1a) < 1.50$ where r1b represents a curvature radius of a lens surface of the first lens on the observation side.

5. The eyepiece lens according to claim 1, wherein in diopter adjustment, the first lens, the second lens, and the third lens move integrally.

6. An observation apparatus comprising an image display element configured to display an image, and an eyepiece lens used to observe an image displayed on an image display surface of the image display element, the eyepiece lens comprising in order from an object side to an observation side: a first lens having a positive refractive power; a second lens having a negative refractive power; and a third lens having a positive refractive power,
- wherein a lens surface of the first lens on the object side has a convex shape,
- a lens surface of the second lens on the observation side has a concave shape, and
- the following conditional expressions are satisfied:

$$0.65 < f11/f < 1.00; \text{ and}$$

$$-0.75 < f22/f < -0.30$$

where f represents a focal length of the eyepiece lens, f11 represents a focal length of the lens surface of the first lens on the object side, and f22 represents a focal length of the lens surface of the second lens on the observation side, and
wherein a conditional expression, $$0.70 < L/f < 0.80$$

where L represents an air equivalent length from the image display surface to a lens surface of the first lens on the observation side when a diopter is 0.

7. An image pickup apparatus comprising:
an image pickup element;
an image display element configured to display an object image formed on the image pickup element; and
an eyepiece lens used to observe an image displayed on an image display surface of the image display element, the eyepiece lens comprising in order from an object side to an observation side: a first lens having a positive refractive power; a second lens having a negative refractive power; and a third lens having a positive refractive power,
wherein a lens surface of the first lens on the object side has a convex shape,
wherein a lens surface of the second lens on the observation side has a concave shape, and
wherein the following conditional expressions are satisfied:

$$0.65 < f11/f < 1.00;$$

$$-0.75 < f22/f < -0.30; \text{ and}$$

$$-100.00 < (r2b + r1a)/(r2b - r1a) < -5.00$$

where f represents a focal length of the eyepiece lens, f11 represents a focal length of the lens surface of the first lens on the object side, f22 represents a focal length of the lens surface of the second lens on the observation side, r1a represents a curvature radius of the lens surface of the first lens on the object side, and r2b represents a curvature radius of the lens surface of the second lens on the observation side.

* * * * *